(12) United States Patent
Burston et al.

(10) Patent No.: US 7,237,329 B2
(45) Date of Patent: Jul. 3, 2007

(54) BEAD SEAT BAND AND WHEEL ASSEMBLY

(76) Inventors: Christopher Ralph Burston, PO Box 1464, Traralgon, Victoria 3844 (AU); Sean Anthony Burston, 12 Camileri Street, Eimeo, Queensland 4740 (AU)

( * ) Notice: Subject to any disclaimer, the term of this patent is extended or adjusted under 35 U.S.C. 154(b) by 0 days.

(21) Appl. No.: 10/842,656

(22) Filed: May 10, 2004

(65) Prior Publication Data

US 2004/0245846 A1    Dec. 9, 2004

(30) Foreign Application Priority Data

May 13, 2003    (AU)    ............................ 2003902313

(51) Int. Cl.
 B21D 53/30    (2006.01)
 B60B 11/00    (2006.01)
(52) U.S. Cl. .................. 29/802; 301/13.2; 301/36.1; 152/409; 29/894.3
(58) Field of Classification Search ............ 152/279.5, 152/410, 409, 411, 396, DIG. 10; 301/36.1, 301/63 R, 13.2; 29/802, 894.3
 See application file for complete search history.

(56) References Cited

U.S. PATENT DOCUMENTS

| | | | | |
|---|---|---|---|---|
| 2,537,624 A | * | 1/1951 | Brink | ......................... 152/410 |
| 2,614,603 A | * | 10/1952 | Howley | ...................... 152/404 |
| 2,874,748 A | * | 2/1959 | Powers | ....................... 152/406 |
| 3,500,891 A | * | 3/1970 | Collins | ....................... 157/1.2 |
| 3,512,840 A | * | 5/1970 | Foster et al. | ............. 301/37.32 |
| 3,783,927 A | * | 1/1974 | Verdier | ....................... 152/409 |
| 3,963,417 A | * | 6/1976 | Placek | ........................ 432/225 |
| 4,003,421 A | * | 1/1977 | Lejeune | ...................... 152/409 |
| 4,175,606 A | * | 11/1979 | Bailey | ........................ 152/399 |
| 4,706,723 A | * | 11/1987 | Loeber et al. | .............. 152/410 |
| 4,911,216 A | * | 3/1990 | Yamoto et al. | ............. 152/410 |
| 5,083,597 A | * | 1/1992 | France | ........................ 152/410 |
| 6,148,941 A | * | 11/2000 | Hinton et al. | .............. 180/65.5 |
| 6,487,900 B1 | * | 12/2002 | Lee | ............................. 73/146 |
| 6,568,764 B2 | | 5/2003 | McNeil et al. | |
| 6,715,523 B2 | * | 4/2004 | Oba et al. | ................... 152/410 |

FOREIGN PATENT DOCUMENTS

AU    745001    3/2002

* cited by examiner

*Primary Examiner*—Russell D. Stormer
(74) *Attorney, Agent, or Firm*—Workman Nydegger

(57) ABSTRACT

A multi-wheel assembly includes an outer wheel having an outer wheel assembly for an outer tire. The outer wheel assembly includes an outer wheel rim, a removable front bead seat band such that the outer tire may be removed from the outer wheel rim. A removable rear bead seat band is also provided. The multi-wheel assembly also includes an inner wheel having an inner wheel assembly including an inner wheel rim and a removable front bead seat band which is radially expandable and able to pass over the outer wheel rim. The dimensions of the outer wheel rim are such that the inner tube is able to pass over the outer wheel rim. A radially expandable bead seat band is also disclosed. A method of removing a tire is disclosed as well as a method of modifying a wheel assembly.

7 Claims, 7 Drawing Sheets

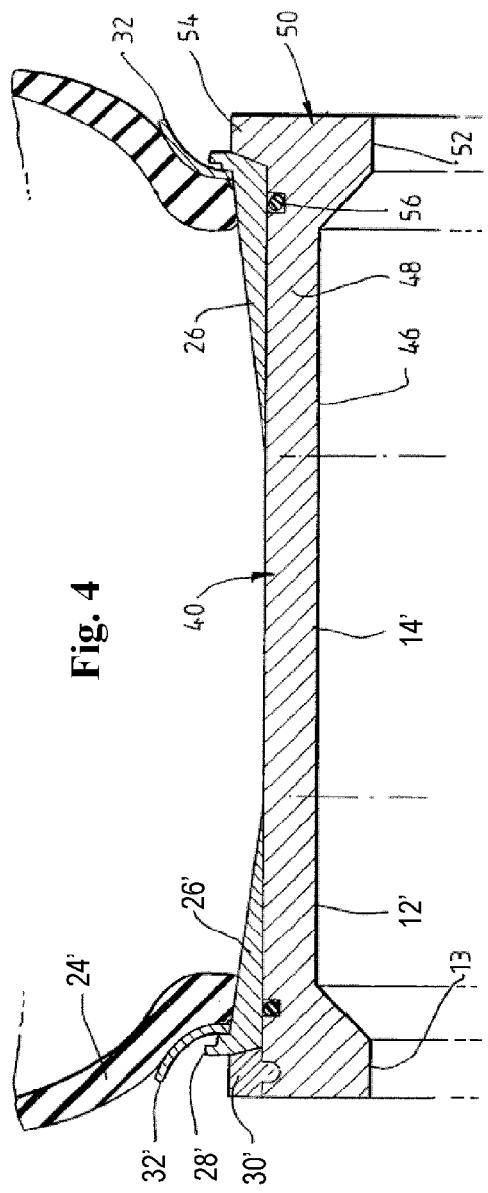
Fig. 4
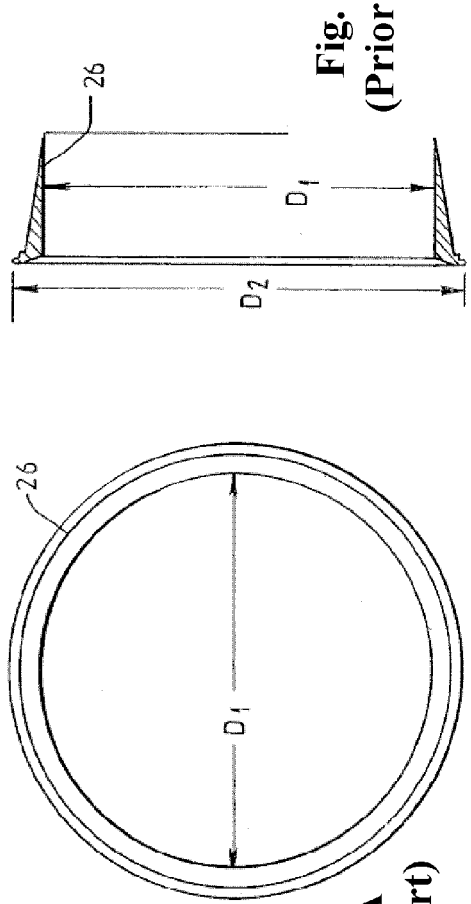
Fig. 5B (Prior Art)
Fig. 5A (Prior Art)

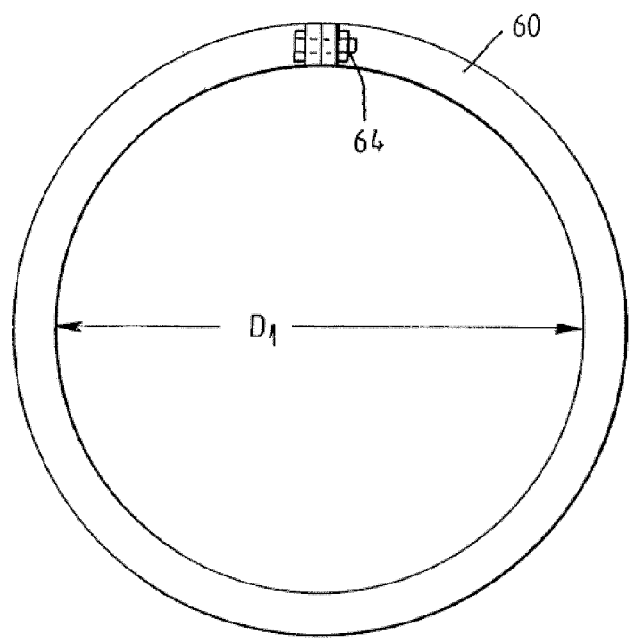
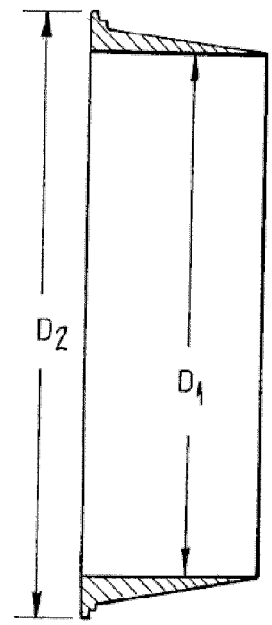
Fig. 6A　　　　　　　　　Fig. 6B
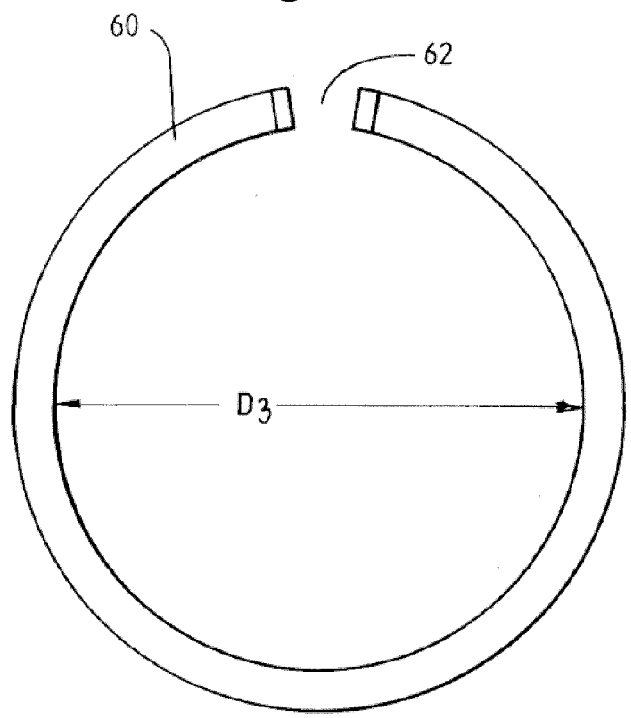
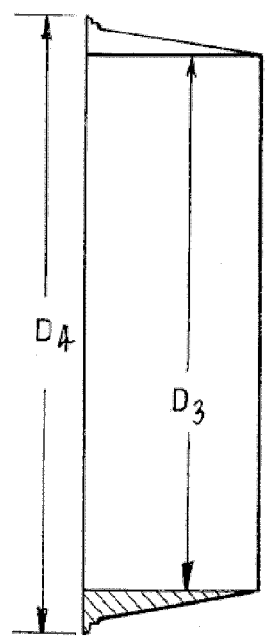
Fig. 7A　　　　　　　　　Fig. 7B

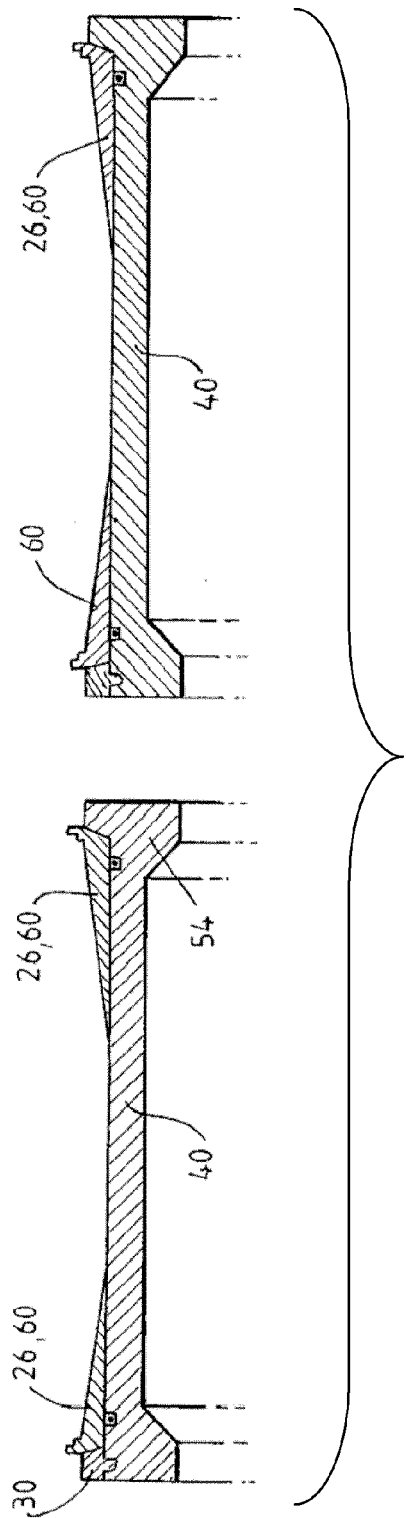
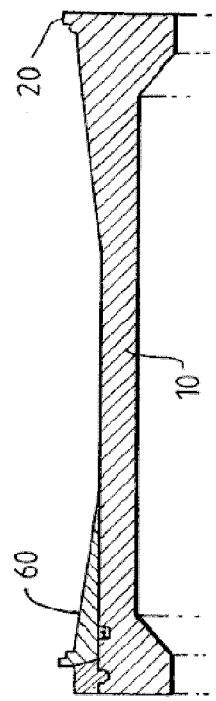
Fig. 9A
Fig. 9B

BEAD SEAT BAND AND WHEEL ASSEMBLY

CROSS-REFERENCE TO RELATED APPLICATIONS

Not applicable.

BACKGROUND OF THE INVENTION

1. The Field of the Invention

The present invention relates to improved multi-wheel assemblies, in particular, although not exclusively, for heavy transport vehicles. The invention also relates to a new or improved bead set band. The invention also relates to a method of retrofitting an existing wheel assembly with a modified design.

2. The Relevant Technology

Demountable rims and wheels are commonly mounted in due configuration on rear axle(s) on heavy duty vehicles such as earth moving trucks and trailers typically used in the mining industry. There are also some applications, though comparatively rare where the tires in dual mounted configuration are found on front axles of heavy equipment. The current wheel and rim design as applied to a dual wheel/rim situation is shown in FIG. 1. A segment of the rim base 10 is shown in cross section. The rim base 10 is made up of a front portion 12 a middle portion 14 and a rear portion 16. Each of these portions is formed by rolling and machining and then the three portions are circumferentially welded together to form the finished rim base 10. A wheel disc can be welded onto the inner diameter of the rim base.

The rear portion 16 has a radially outer surface 18 which is ramped radially outwardly in the direction towards the rear edge 20. The rear edge 20 also has a flange projecting radially outwardly. To provide additional support to the tire, an annular flange 22 is provided. The diameter of the radially outer periphery of the rear edge 20 is greater than the inner diameter of the tire wall. Accordingly, the rear tire wall is not permitted to pass beyond the rear edge 20 as the outside of the rear tire wall sits against and maintains an outward force on the annular flange 22.

At the front portion 12 of the rim 10, the radially outer periphery is provided substantially level with middle portion 14. The tire 24 is assembled onto the wheel rim by being passed over the front portion 12 until the back wall abuts against the rear edge 20 indirectly through the annular flange 22. The front wall of the tire 24 is held in position by the use of an annular bead seat band 26. The bead seat band 26 has a ramped radially outer periphery with a peripheral flange 28 projecting radially outwardly. The bead seat band 28 is held in place by a lock ring 30. An annual flange 32 is also inserted between the front tire wall and the peripheral flange 28.

In a dual wheel assembly, two such wheels or rims would be located side-by-side, with the lock ring 30 of each wheel or rim adjacent the lock ring 30 of the other wheel or rim see (FIG. 2). In order to change the tire of the inner wheel or rim, it is necessary to remove the outer wheel or rim to gain access to the inner wheel or rim. To change the tire of the inner wheel or rim, the tire is deflated and then the lock ring and bead seat band and flange are removed so that the tire can be removed. Once the tire has been changed, the flange 32, bead seat band 29 and lock ring 30 are returned, following which the outer wheel/rim can be returned to its position on the axle. For tires mounted on demountable rims, deflation of both outer and inner tire is required prior to loosening the cleat nuts for safety reasons.

To change the tire of the outer wheel or rim, the wheel or rim must first be removed from the truck. Once removed from the truck it is normally placed horizontally on the ground, the tire is first deflated and then the lock ring and bead seat band and flange are removed so that the tire can be removed. Once the tire has been changed, the flange 32, bead seat band 28 and lock ring 30 are returned, the inner wheel/rim can be returned to its positions on the axle. For tires mounted on demountable rims deflation of both outer and inner tire is required prior to loosening the cleat nuts for safety reasons.

The removal of the outer wheel rim to gain access to a tire of an inner wheel is time consuming. In particular, there are a large number of wheel nuts to be removed and later refitted from the outer wheel. When these wheel nuts are refitted, they are required to be retorqued to ensure adequate bond between the track axle and the wheel or rim. Furthermore, the lifting and removal of the outer wheel rim and later refitting has potential to damage the stud threads. Furthermore, the mere task of lifting the very heavy outer wheel rim has associated risks.

One prior art solution has been presented in Australian patent application No. 200126561 (see FIG. 3). This proposed solution involves reducing the size of the outer wheel rim so that the inner tire may be slid over the outer wheel rim without having to remove the outer wheel rim. To compensate for the decreased diameter in the wheel rim, thicker bead seat bands are used at both the front and the rear of the outer wheel rim. The different sizing of the outer wheel leads to introduction of additional parts including a new size for the wheel rim, a new sizing for the band seat bands, the locking-ring and "O" rings. In any situation where it is desirable to keep quantities of replacement parts in stock, the introduction of yet more parts in often remote locations and would seem to be a disadvantage. Fitting of heavy equipment tires has recorded many fatalities, accidents and near misses that were caused by mismatching of wheel/rim assembly components, the introduction of an "O" ring, lock ring, bead seat band and flange arrangement of different dimension and having specific application would only seem to increase the potential for mismatched components to be used with often tragic consequences.

Accordingly, it is an object of the present invention to address at least some of the aforementioned disadvantages or at least provide the public with a useful choice.

The foregoing prior art discussion is not to be taken as an admission of common general knowledge.

SUMMARY OF THE INVENTION

In accordance with the first aspect of the present invention there is provided a method of modifying a wheel assembly for a tire, the wheel assembly including a wheel rim having a front portion, and a rear portion, the rear portion having a tire engaging periphery which is ramped or stepped in a radially outward manner towards the rear edge of the wheel rim to retain the tire on the rim, and a removable front bead seat band being mounted over the front portion, the method including:

removing the rear portion of the wheel rim;

connecting a replacement rear portion onto the remainder of the wheel rim, wherein the replacement rear portion has a radially outer projection to retain a removable rear bead seat band on the rim; and further providing the removable rear bead seat band having a radially outer periphery which is ramped or stepped radially outwardly towards the rear edge of the wheel rim.

The wheel rim may further include a middle portion.

The front portion, middle portion and rear portion of the wheel rim may be connected by being welded together. The rear portion may be removed by machining it from the remainder of the wheel rim. Likewise, the replacement rear portion may be connected by welding.

The term "wheel assembly" is to be broadly construed to include rim types which have a wheel disc or knave plate attached to the inner circumference and to cover demountable rims without a disc.

In the context of the description and claims, the terms "front", "middle" and "rear", may be used to indicate portions of the wheel rim relative to the outside of the vehicle. In other words, the "front" faces the outer end of the axle such that it faces a maintenance person who is to remove the wheel rim or the tire. In a similar manner, the term "outer" refers to the orientation relative to the vehicle so that "outer" is close to the sides and the term "inner" means close to the longitudinal centerline of the vehicle. In contrast, where it is intended to mean the outer circumference of the wheel rim or tire, the term "radially outer" or similar terms are used to distinguish from the term "outer" as set out above.

The rear bead seat band is ideally of the same form as the front bead seat band so that a common part may be used for both. The front bead seat band may be retained by a lock ring in contrast to the projection retaining the rear bead seat band. The rear bead seat band may be the standard bead seat band used for the particular tire size. This means that the same kind of bead seat band may be used for modified wheel assemblies as would be used for unmodified wheel assemblies, limiting the different number of parts which would be required. Alternatively, a radially expandable bead seat band may be employed.

The replacement rear portion may further incorporate a peripheral groove to receive an O-ring seal.

The method of the present invention may also comprise removing the front portion of the wheel rim and replacing it with a replacement front portion having a radially outer projection to retain the front bead seat band. This change need not occur when the rear bead seat band is removed but may be implemented as the front section wears. The invention may also reside in a reversal of the method, removing the front portion first. Where both front and rear portions of the rim have been removed, the invention can be implemented with radially expandable bead seat bands.

In accordance with a second aspect of the invention, there is provided a bead seat band for a wheel rim, wherein the bead seat band is radially expandable.

The bead seat band may comprise an annulus with a gap such that the bead seat band is expandable between a closed configuration whereby the gap is closed and an open configuration whereby the gap is open and sufficient to allow the bead seat band to pass beyond over the widest part of the wheel rim. Alternatively, the bead seat band may be provided in multiple portions, e.g. two halves able to be fixed together.

The expandable bead seat band may be incorporated into a multi-wheel assembly in accordance with a third aspect of the invention including:
an outer wheel having an outer wheel assembly for an outer tire, wherein the outer wheel assembly includes an outer wheel rim, a removable front bead seat band such that the outer tire may be removed from the outer wheel rim, and a removable rear bead seat band; and
an inner wheel having an inner wheel assembly for an inner tire, the assembly including an inner wheel rim and a removable front bead seat band which is radially expandable and able to pass over the outer wheel rim, wherein the dimensions of the outer wheel rim are such that the inner tire is able to pass over the outer wheel rim.

The above arrangement may be implemented in a dual wheel assembly. However, the invention is not so limited and may be applied to arrangements with three or more wheels on a single axle. In such an arrangement, each of the wheels other than the innermost suitably has radially expandable bead seat bands. Each of the radially expandable bead seat bands may be seated against a radially outward projection provided in the rim which is complementary to the bead seat band.

Preferably, the front bead seat band of the outer wheel has the same dimensions as the rear bead seat band. Furthermore, it is preferred that the front and rear bead seat bands are standard bead seat bands for the given tire size. Preferably, the outer wheel rim and the inner wheel rim are of substantially the same radially outer dimensions in the portions where the bead seat bands are seated.

The front bead seat band of the inner wheel may be retained by a removable lock ring. Alternatively, the front bead seat band may be retained by a radially outwardly projection. Suitably, the dimensions of this projection are such that the inner tire is able to pass over the radially outer periphery of the projection.

The inner wheel rim may be of a conventional configuration with an expandable front bead seat band held by a lock ring and an integral ramped back portion.

In accordance with a fourth aspect of the present invention there is provided a method of assembling a multi-wheel assembly, the method comprising:
providing an outer wheel assembly for an outer tire;
providing an inner wheel assembly for an inner tire; the assembly including an inner wheel rim;
mounting the inner wheel rim on a vehicle axle, followed by the outer wheel assembly, wherein the outer wheel assembly includes an outer wheel rim and a removable front bead seat band such that the outer tire may be removed from the outer wheel rim, and a removable rear bead seat band, and
wherein the inner wheel assembly includes a removable front bead seat band which is radially expandable and able to pass over the outer wheel rim
wherein the dimensions of the outer wheel rim are such that the inner tire is able to pass over the outer wheel rim.

The inner and outer wheel assemblies may be of the form as set out in accordance with the second aspect of the present invention.

The present invention may also reside in a method of removing the inner tire of the multi-wheel assembly without removal of the outer wheel rim by sliding the inner tire over the outer wheel rim once the outer tire and the radially expandable bead seat band have been removed.

In accordance with a fifth aspect of the present invention there is provided a wheel assembly for a tire, the wheel assembly including:
a wheel rim having an integral front radially outward projection and an integral rear radially outward projection;

a front removable bead seat band seated against the front projection; and a rear removable bead seat band seated against the rear projection, wherein the inner and outer removable bead seat bands are radially expandable bead seat bands able to pass over at least the front projection.

This invention may also be said broadly to consistent the parts, elements, and features referred to or indicated in the specification of the application, individually or collectively and any or all combinations of any two or more of said parts, elements of features and where specific integers are mentioned herein which have known equivalents in the art to which this invention relates, such know equivalents are deemed to be incorporated herein as if individually set forth.

The invention resides in the foregoing and also envisages constructions of which the following gives examples.

BRIEF DESCRIPTION OF THE DRAWINGS

In order that the invention may be more fully understood, some embodiments will now be described, by way of example, with reference to the drawings in which:

FIG. 4 is a cross-sectional view of a segment of a wheel rim with tire according a preferred embodiment of the present invention;

FIGS. 5A and 5B are views of the bead seat band according to the prior art;

FIGS. 6A and 6B are views of the bead seat band according to a preferred embodiment of the invention, the bead seat band being illustrated in closed configuration;

FIGS. 7A and 7B are views of the bead seat band of FIGS. 6A and 6B shown in the open configuration;

FIG. 9A illustrates the dual mount arrangement of FIG. 8, together with appropriate bead seat bands;

FIG. 9B is a schematic view of a segment of an alterative wheel rim that can be used in a dual mount configuration;

DETAILED DESCRIPTION OF THE PREFERRED EMBODIMENTS

FIG. 4 illustrates a modified form of a wheel assembly. Many parts of the wheel assembly are similar to the prior art wheel assembly illustrated in FIG. 1. Accordingly, like numerals represent like parts. For example, the element referred to as element 12' in FIG. 4 is similar to the element referred to as element 12 in FIG. 1.

The wheel rim assembly includes a wheel rim 40 which has three portions. The front portion 12' and the middle portion 14' are of the same form as in the prior art rim shown in FIG. 1. The rear portion 46 of the wheel rim 40, however, is modified from the rear portion 16 shown in FIG. 1.

Figure 1:
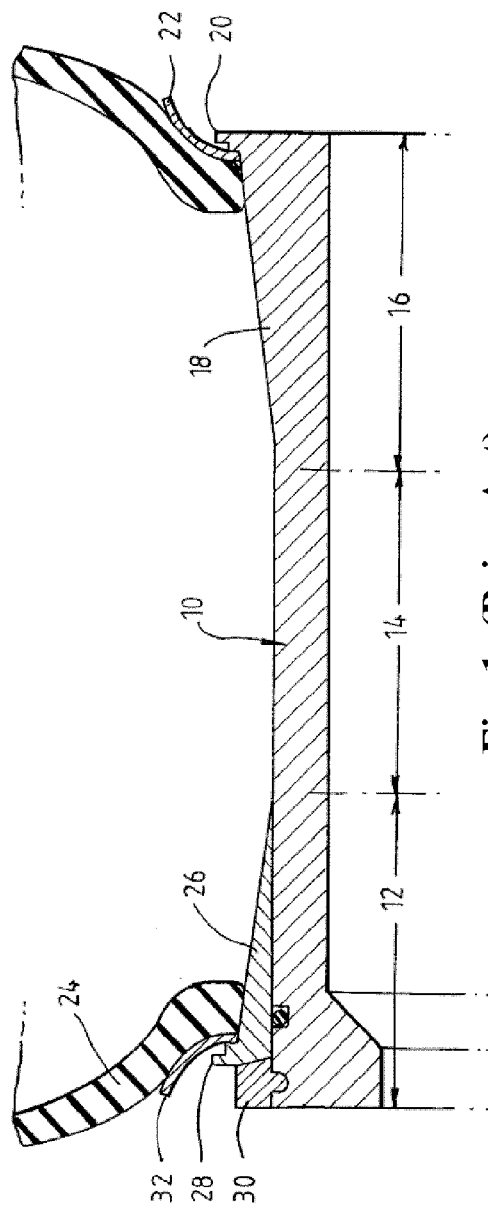
FIG. 1 is a cross-sectional view of a segment of a wheel rim with tire according to the prior art.
Figure 3:
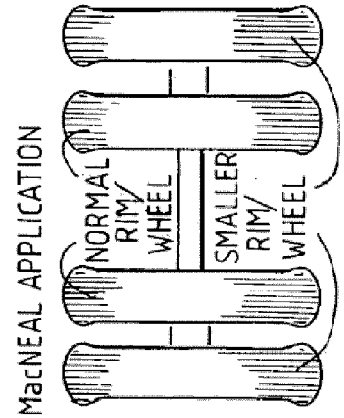
FIG. 3 is a schematic view of a dual mount configuration according to the prior art.
Figure 2:
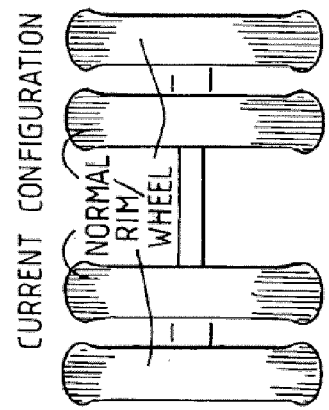
FIG. 2 is a schematic view of a prior art dual mount configuration.

Furthermore, the components mounted on the front portion 12' are the same as the prior art shown in FIG. 1 and like numerals represent like parts. Additionally, it will be seen that the front portion has two parallel grooves arranged on the radially outer surface. These parallel grooves form dual gutters. The inner gutter (relative to the wheel rim) seats an O-ring. The outer gutter seats lock ring 30'.

The rear portion 46 is modified to no longer be provided with the gradually inclined ramped surface 18. Instead, the rear portion 46 has a web portion 48 presenting a radially outer surface that is substantially level with that of the middle portion 14. The rear portion 46 also has a peripheral rim 50 which includes integrally formed dependent rim portion 52 and radially outwardly projecting rim portion 54. The dependent rim portion 52 corresponds to the form of the dependent rim portion 13 formed at the front of the front portion 12'. The radially outwardly projecting rim portion 54 corresponds approximately to the form of the lock-ring 30' at the front of the front section 12'. The two portions 52 and 54 are integrally formed as shown. This combined section which corresponds to the front section of the front portion (including lock ring 30') has been established for reliability and robustness by years of application in the field.

The rear portion 46 also uses a rear bead seat band 26 which is in the same form as the standard bead seat band used on the front portion 12'. A peripheral groove 56 is also formed adjacent the projecting rim 54 in which an O-ring is seated to provide a seal FIGS. 5A and 5B illustrate the form of a prior art bead seat band 26. The diameter $D_1$ mates with the diameter of the seat for the bead seat band on the rims 10, 40. The diameter $D_2$ is such that the tire 24 is prevented from passing therebeyond, with the combined assistance of flange 32.

FIGS. 6A and B and 7A and B illustrate a modified form of a bead seat band 60. The bead seat band 60 is in the form of an annulus having a gap 62 provided therein as shown in FIG. 7A. FIG. 6A illustrates the closed configuration whereby the gap 62 is closed through the use of a bolt/pin 64. An airtight seal is formed at the closed gap 62. The dimensions $D_1$ and $D_2$ correspond to those of the prior art bead seat band illustrated in FIGS. 5A and B. In the expanded configuration of FIGS. 7A and B, the internal diameter of the bead seat band 60 is $D_3$.

Figure 8:
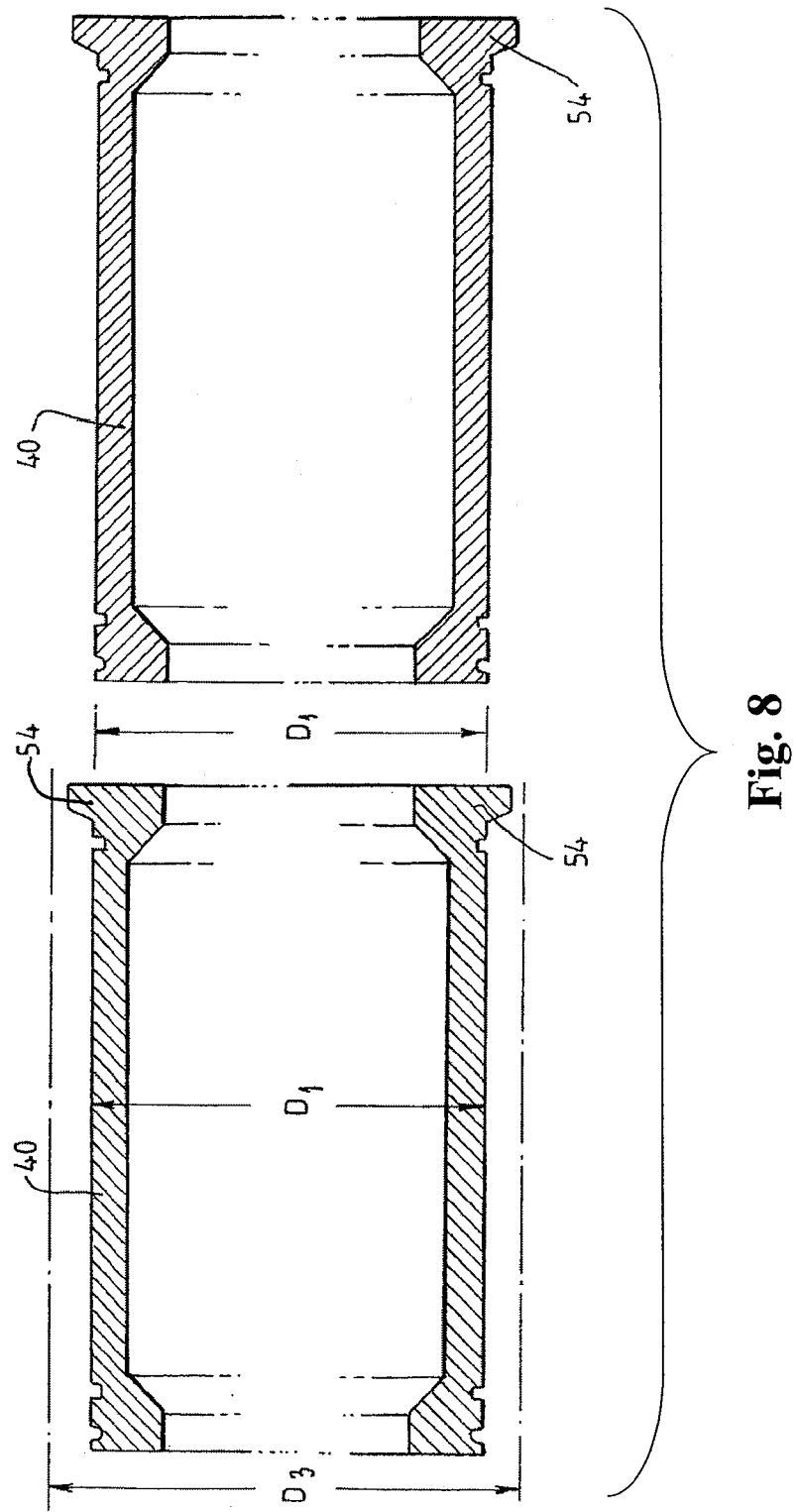
FIG. 8 is a schematic view of adjacent wheel rims in a dual mount configuration incorporating the wheel rim illustrated in FIG. 4.

FIG. 8 illustrates a dual mount configuration with two wheel rims 40 as shown in FIG. 4 disposed side-by-side. The diameter $D_1$ of the rims 40 where the bead seat bands are seated is $D_1$, permitting seating of the bead seat bands 60 in the closed configuration. It can be seen that the diameter $D_3$ of the bead set bands 60 in the expanded configuration is sufficient to clear the projecting rim portions 54 as illustrated in FIG. 8.

FIGS. 9A and B illustrate two alternative arrangements for a dual mount configuration. In the first, illustrated in FIG. 9A, two modified rims 40 may be disposed side-by-side in the manner shown. In this arrangement, the two bead seat bands could be of the conventional type 26 or the modified type 60. In this arrangement, for the inner rim, the outer bead seat band must be of the modified type 60 to enable it to clear the projecting rim portion 54. The outer bead seat band on the inner rim 40 can be either the conventional type 26 or the new type 60.

FIG. 9B illustrates an alternative arrangement for the inner rim using a conventional type rim 10 as shown.

When it is required to change the inner tire, the following procedure is used:

outer tire is deflated, and the lock-ring 30, outer flange 32 and the front bead seat band 26/60 are removed;

the outer tire is then removed from the outer rim 40;
the rear bead seat band 26/60 and the peripheral flange 32 are then removed;
the inner tire is deflated and its lock-ring 30 is removed and slid between the inner and outer wheel rims;
the front bead seat band 60 of the inner wheel and the flange 32 is then removed and passed over the outer rim;
the inner tire is slid off the inner wheel rim 40/10;
the inner tire is slid over the outer wheel rim 40.

Importantly, the radially outer diameter of the projecting rim 54 is such that the inner tire is able to pass thereover. Preferably, the diameter of projecting rim 54 is less than the diameter of the opening in the inner tire.

Figure 10A:
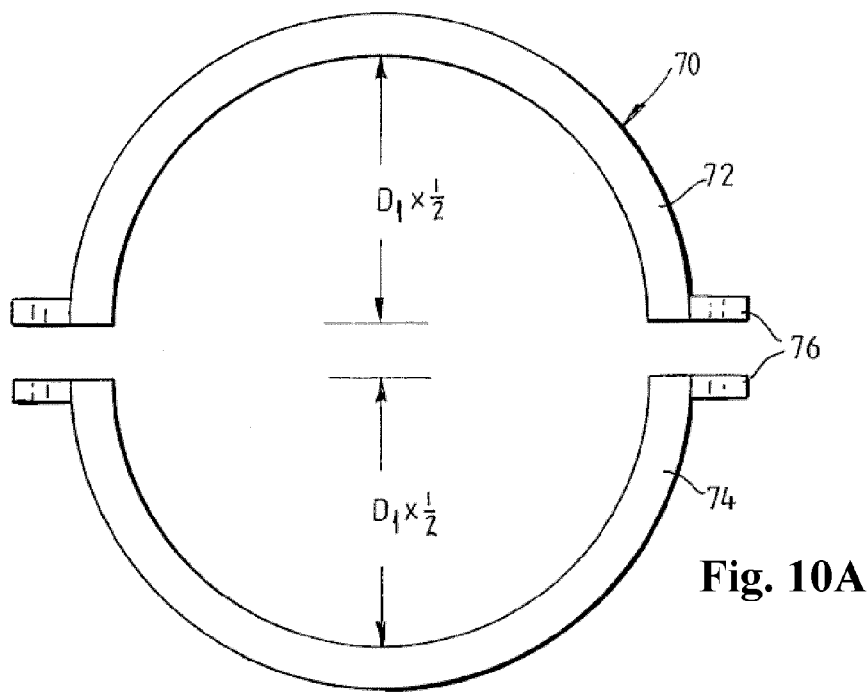
FIGS. 10A–C are views of a second preferred radially expandable bead seat band.
Figure 10B:
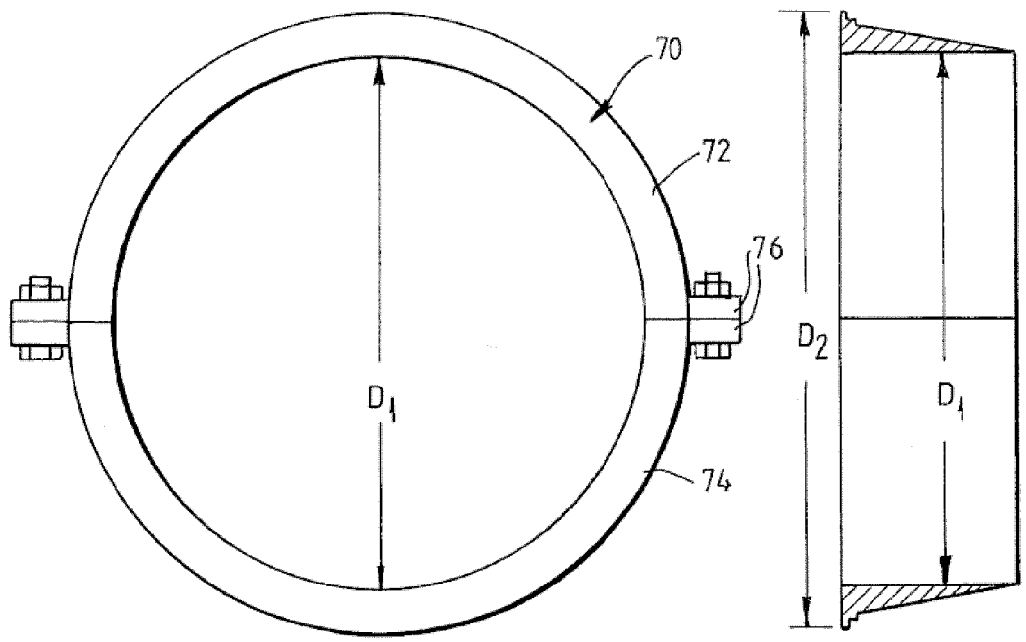
Figure 10C:
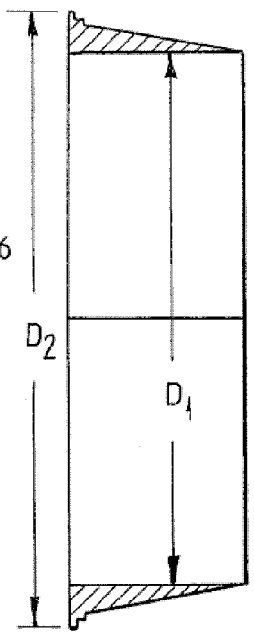

FIGS. 10A–C illustrate an alternative expandable bead seat band 70 comprising two halves 72, 74 which are separable to enable the bead seat band 70 to be removed. The two halves 72, 74 include radial projections 76 enabling the two halves 72, 74 to be bolted together.

Reconstruction of a prior art wheel rim to produce the modified wheel rim 40 will now be described. As already described with the prior art wheel rim in FIG. 1, the prior art wheel rim is constructed of three portions, a front portion 12, a middle portion 14 and a rear portion 16. Each of these portions is initially formed prior to being welded together. It is proposed that the modified wheel rim could be constructed from a prior art wheel rim by removing the rear portion 16 and rebuilding with a replacement rear portion 46 as shown in FIG. 4.

To produce the modified wheel rim 40 shown in FIG. 4 from the prior art wheel rim 10 shown in FIG. 1, a method of modifying a wheel assembly for a tire is performed according to one embodiment of the invention. The wheel assembly originally includes a prior art wheel rim 10 having a front portion 12 and a rear portion 16, the rear portion 16 having a tire engaging periphery 18 which is ramped or stepped in a radially outward manner towards the rear edge 20 of the wheel rim 10 to retain the tire on the rim 10, and a removable front bead seat band 26 being mounted over the front portion 12.

The method includes
removing the rear portion 16 of the wheel rim 10;
connecting a replacement rear portion 46 onto the remainder of the wheel rim, wherein the replacement rear portion 46 has a radially outer projection 54 to retain a removable rear bead seat band 26 on the rim; and
further providing the removable rear bead seat band 26 having a radially outer periphery which is ramped or stepped radially outwardly towards the rear edge of the wheel rim.

Figure 11:
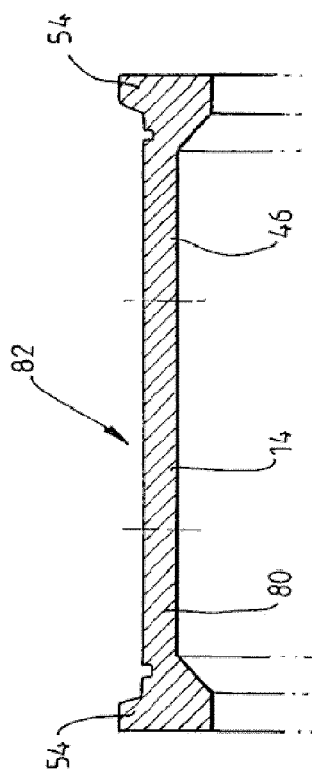
FIG. 11 is a schematic view of a segment of a wheel rim according to another preferred embodiment of the present invention.

Additionally, the front portion 12' could also be removed and replaced with a replacement front portion 80 which is substantially the mirror image of replacement rear portion 46 as shown in FIG. 11. These replacement portions 46, 80 can be replaced incrementally as each section wears out.

While the above describes a manner of modifying existing wheel rims, the new form of the wheel rim can be machined anew.

Figure 12:
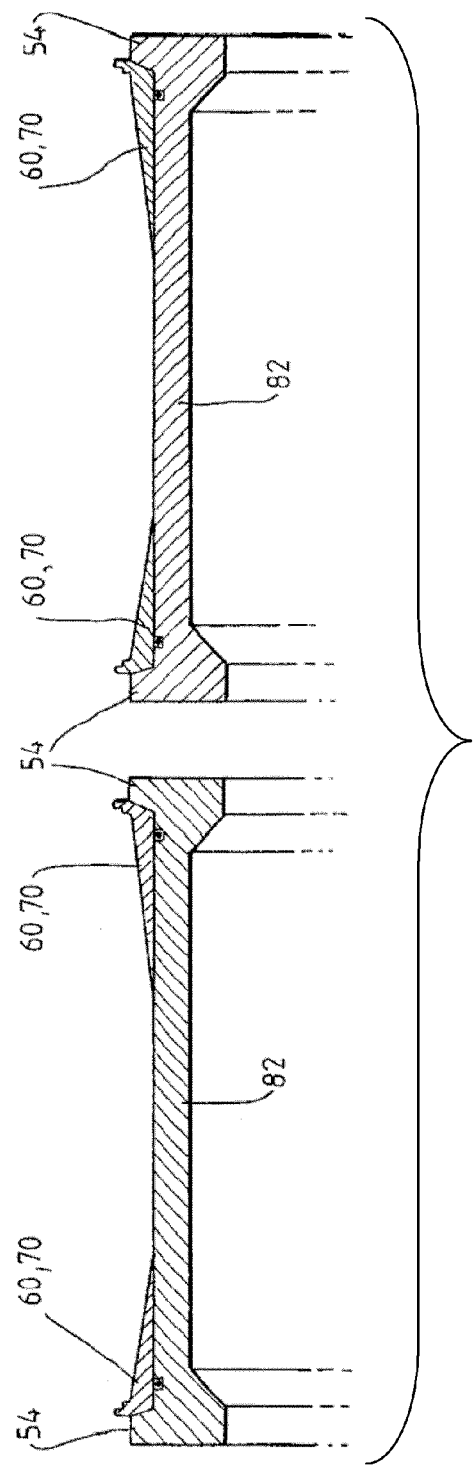
FIG. 12 illustrates a dual mount configuration utilizing the wheel rim illustrated in FIG. 11.

FIG. 12 illustrates a dual mount configuration utilising the modified wheel rims 82 as illustrated in FIG. 11. In each case, the bead seat bands are of the expandable type 60/70 to enable the bead seat bands to pass over the projecting rim portions 54.

The foregoing describes only some embodiments of the present invention and modifications may be made thereto without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A method of modifying a wheel assembly for a tire, the wheel assembly including a wheel rim having a front portion, and a rear portion, the rear portion having a tire engaging periphery which is ramped or stepped in a radially outward manner towards the rear edge of the wheel rim to retain the tire on the rim, and a removable front bead seat band being mounted over the front portion, the method comprising:
    removing the rear portion of the wheel rim;
    connecting a replacement rear portion onto the remainder of the wheel rim, wherein the replacement rear portion has a radially outer projection to retain a removable rear bead seat band on the rim; and
    further providing the removable rear bead seat band having a radially outer periphery which is ramped or stepped radially outwardly towards the rear edge of the wheel rim.

2. The method as claimed in claim 1 wherein the wheel rim further includes a middle portion and the rear portion is removed by machining it from the remainder of the wheel rim and the replacement rear portion is connected by welding.

3. The method as claimed in claim 1 wherein the rear bead seat band is of the same form as the front bead seat band so that a common part may be used for both.

4. The method as claimed in claim 1 wherein the front bead seat band is retained by a lock ring.

5. The method as claimed in claim 1 wherein the rear bead seat band comprises a standard bead seat band used for the particular tire size.

6. The method as claimed in claim 1 wherein the rear bead seat band comprises a radially expandable bead seat band.

7. The method as claimed in claim 1 wherein the method further comprises removing the front portion of the wheel rim and replacing it with a replacement front portion having a radially outer projection to retain the front bead seat band.

* * * * *